(12) United States Patent
Hansen et al.

(10) Patent No.: US 7,849,006 B2
(45) Date of Patent: Dec. 7, 2010

(54) ONLINE STAGING OF AUCTION SETTLEMENT TRANSACTIONS

(75) Inventors: David L. Hansen, Highlands Ranch, CO (US); Mark D. Baumgart, Larkspur, CO (US)

(73) Assignee: The Western Union Company, Englewood, CO (US)

(*) Notice: Subject to any disclaimer, the term of this patent is extended or adjusted under 35 U.S.C. 154(b) by 1585 days.

(21) Appl. No.: 10/401,506

(22) Filed: Mar. 27, 2003

(65) Prior Publication Data

US 2003/0229578 A1     Dec. 11, 2003

Related U.S. Application Data

(63) Continuation-in-part of application No. 10/262,529, filed on Sep. 30, 2002, which is a continuation-in-part of application No. 10/109,559, filed on Mar. 27, 2002.

(51) Int. Cl.
*G06Q 40/00* (2006.01)

(52) U.S. Cl. ......................................................... 705/39

(58) Field of Classification Search ............... 705/39–40
See application file for complete search history.

(56) References Cited

U.S. PATENT DOCUMENTS

| | | | |
|---|---|---|---|
| 5,220,501 A | 6/1993 | Lawlor et al. | |
| 5,369,709 A | 11/1994 | Foreman et al. | |
| 5,699,528 A | 12/1997 | Hogan | |
| 5,757,917 A | 5/1998 | Rose et al. | |
| 5,826,241 A | 10/1998 | Stein et al. | |
| 5,845,265 A | 12/1998 | Woolston | |
| 5,920,629 A | 7/1999 | Rosen | |
| 5,978,485 A | 11/1999 | Rosen | |
| 6,012,048 A | 1/2000 | Gustin et al. | |
| 6,029,150 A | 2/2000 | Kravitz | |

(Continued)

FOREIGN PATENT DOCUMENTS

CA     2332715 A1     8/2001

(Continued)

OTHER PUBLICATIONS

BidPay.com, Wayback Machine, Jan. 18, 2001.*

(Continued)

*Primary Examiner*—Olabode Akintola
(74) *Attorney, Agent, or Firm*—Townsend and Townsend and Crew LLP

(57) ABSTRACT

A method for paying for an auction item at least partially using an online payment system by a payor to compensate a payee includes receiving at a host computer system payment information relating to a transaction. The payment information includes comprising at least a payee identifier, a first payment amount, and an auction identifier. The auction identifier relates to an auction that was won by the payor that was for the auction item. The method also includes generating a transaction identifier at the host computer system and transmitting the transaction identifier to the payor. The method further includes receiving at a retail location a payment and using the transaction identifier to relate the payment to the transaction. The method further includes making a second payment amount available to the payee. The second payment amount may be based on the payment.

23 Claims, 10 Drawing Sheets

U.S. PATENT DOCUMENTS

| | | | |
|---|---|---|---|
| 6,061,665 | A | 5/2000 | Bahreman |
| 6,064,990 | A | 5/2000 | Goldsmith |
| 6,070,798 | A | 6/2000 | Nethery |
| 6,119,106 | A * | 9/2000 | Mersky et al. ............. 705/40 |
| 6,122,625 | A * | 9/2000 | Rosen ..................... 705/65 |
| 6,246,996 | B1 | 6/2001 | Stein et al. |
| 6,282,522 | B1 | 8/2001 | Davis et al. |
| 6,308,887 | B1 | 10/2001 | Korman et al. |
| 6,311,170 | B1 * | 10/2001 | Embrey ................... 705/40 |
| 6,367,693 | B1 * | 4/2002 | Novogrod ................ 235/379 |
| 7,039,603 | B2 | 5/2006 | Walker et al. |
| 7,104,440 | B2 * | 9/2006 | Hansen et al. ............ 235/379 |
| 7,177,836 | B1 * | 2/2007 | German et al. ............ 705/40 |
| 7,229,011 | B2 * | 6/2007 | Hansen et al. ............ 235/379 |
| 7,395,241 | B1 * | 7/2008 | Cook et al. ............... 705/39 |
| 7,499,875 | B1 | 3/2009 | May et al. |
| 2002/0016769 | A1 | 2/2002 | Barbara et al. |
| 2002/0029190 | A1 * | 3/2002 | Gutierrez-Sheris .......... 705/39 |
| 2002/0032651 | A1 * | 3/2002 | Embrey ................... 705/40 |
| 2002/0052841 | A1 | 5/2002 | Guthrie et al. |
| 2002/0073008 | A1 * | 6/2002 | Dutta et al. ............... 705/37 |
| 2002/0104878 | A1 | 8/2002 | Seifert et al. |
| 2002/0139849 | A1 | 10/2002 | Gangi |
| 2002/0156734 | A1 | 10/2002 | Yamamoto |
| 2003/0024979 | A1 * | 2/2003 | Hansen et al. ............ 235/379 |
| 2003/0074310 | A1 | 4/2003 | Grovit et al. |
| 2003/0105710 | A1 | 6/2003 | Barbara et al. |
| 2003/0130959 | A1 | 7/2003 | Rosenbaum |
| 2005/0033650 | A1 | 2/2005 | Robertson |
| 2006/0085452 | A1 * | 4/2006 | Cope ..................... 707/100 |
| 2006/0116957 | A1 | 6/2006 | May et al. |
| 2006/0235748 | A1 | 10/2006 | Gordon et al. |
| 2007/0061257 | A1 * | 3/2007 | Neofytides et al. ......... 705/40 |
| 2007/0061258 | A1 * | 3/2007 | Neofytides et al. ......... 705/40 |
| 2007/0118472 | A1 | 5/2007 | Allen-Rouman et al. |
| 2007/0136189 | A1 | 6/2007 | German et al. |
| 2007/0136192 | A1 | 6/2007 | German et al. |
| 2007/0143209 | A1 | 6/2007 | German et al. |

FOREIGN PATENT DOCUMENTS

| | | |
|---|---|---|
| EP | 0 949 596 A2 | 10/1999 |
| EP | 1 077 436 A2 | 2/2001 |
| WO | WO 96/08783 A | 3/1996 |
| WO | WO 00/22559 A1 | 4/2000 |
| WO | WO 00/46725 A1 | 8/2000 |
| WO | WO 00/67177 A2 | 11/2000 |
| WO | WO 00/79452 A2 | 12/2000 |
| WO | WO 01/24082 A1 | 4/2001 |
| WO | WO 01/53977 A2 | 7/2001 |
| WO | WO 01/71452 A2 | 9/2001 |
| WO | WO 01/86597 A | 11/2001 |
| WO | WO 02/05195 A1 | 1/2002 |
| WO | WO 02/19211 A1 | 3/2002 |
| WO | WO 02/059847 A | 8/2002 |

OTHER PUBLICATIONS

"Western Union Announces Newest Member of Financial Services Family Companies," PR Newswire. New York: Jul. 19, 2001. p. 1.*

Anonymous, "Internet Money Transfers," The Nilson Report. Los Angeles: Mar. 2000., Iss. 712; p. 1.*

Business Wire, *E-Commerce, Email and E-greeting Cards Combine in New Web Site Designed by Interactive Bureau; Flooz.com Features a Fun Online Gift Currency You Send by Email for Any Occasion*, downloaded from website http://www.proquest.umi.com.

Idealab Company, PayMe.com, downloaded from website https://ssl.idealab.com/ on Feb. 16, 2000.

Confinity, Inc., PayPal.com, *How PayPal.com Works*, downloaded from website http://www.paypal.com/ on Feb. 7, 2000.

Moozakis, Chuck. *Hubs Ready E-Settlement*. InternetWeek, Dec. 4, 2000 (See entire document).

Talmor, Sharona, *Product File*. The Banker. Mar. 1995, vol. 145. No. 829 (See entire document).

Citigroup Taps Commerce One for Portal. Corporate EFT Report. Mar. 1, 2000. vol. 20, No. 4 (See entire document).

American Banker Inc.—Bond Buyer 2001, *In Brief: Fortex, Travel Checks on B of A Site*, American Banker, New York, NY, May 18, 2001, vol. 166, Issue 96, downloaded from http://proquest.umi.com.

Phillips Business Information, LLC, *Netbank Cuts Deal With Thomas Cook to Offer Travel Money On-Line*, Card New, Potomac, Sep. 5, 2001, vol. 16, Issue 17, downloaded from http://proquest.umi.com.

Business Editors, "Citibank's c2it Goes Global With International Funds Transfer Capability," Business Wire, 4 pages, May 22, 2001.

PR Newswire, "Cash Technologies Receives U.S. Patent Office Approval for Its E-Commerce Technology," 2 pages, Apr. 25, 2001.

PR Newswire, "Cash Technologies Signs Strategic Alliance Agreement With Western Union," 2 pages, Mar. 8, 2001.

* cited by examiner

ONLINE STAGING OF AUCTION SETTLEMENT TRANSACTIONS

This application is a continuation-in-part of and claims priority to U.S. patent application Ser. No. 10/262,529, filed on Sep. 30, 2002, which is a continuation-in-part of and claims priority to U.S. patent application Ser. No. 10/109,559, filed on Mar. 27, 2002, which applications are incorporated herein by reference in their entirety for all purposes.

This application is related to co-pending, commonly assigned U.S. patent application Ser. No. 09/307,485, filed on May 10, 1999, and to co-pending, commonly assigned U.S. patent application Ser. No. 10/045,313, filed on Oct. 23, 2001, and to co-pending, commonly assigned U.S. patent application Ser. No. 10/289,802, filed on Nov. 7, 2002, and to U.S. patent application Ser. No. 09/427,249, filed on Oct. 26, 1999 (now U.S. Pat. No. 6,488,203, issued on Dec. 3, 2002), which applications and patent are incorporated herein by reference in their entirety for all purposes.

BACKGROUND OF THE INVENTION

This invention relates in general to online payment systems and, more specifically, to Internet-based payment systems that use negotiable instruments for payments to non-merchant parties such as individuals.

There are online systems that allow paying parties that may not have a merchant account with a credit card company or bank. Further, some parties do not even have a personal bank account to accept payment into. In these situations, a money order may be used to pay for merchandise, services or to otherwise send money. There are systems that automate the process of sending money orders through use of an online system where a payor can have a money order generated and mailed to the payee. A bank account or credit card is used by the online system to fund the money order and pay any service fees. These online systems are commonly used to pay for online auction transactions where the buyer and seller may not be in the same city or country.

Where the payee is in a country using a different currency, cashing a foreign money order is problematic. Although money exchanges and banks can cash a foreign money order, the exchange rate may be unfavorable and service fees may be added to the transaction. Further, a foreign bank cashing the money order may place a hold on the availability of the funds until they clear, which can take months. Where the money order is in payment for an auction, the fees and other costs deducted from the payment limit the profit on the auction. Further still, if a payor does not have a credit card or bank account, or does not wish to provide such information online, the payor is unable to avail himself of such electronic transactions. These impediments to commerce serve to impede transactions in different currencies.

BRIEF DESCRIPTION OF THE DRAWINGS

The present invention is described in conjunction with the appended figures.

Figure 1:
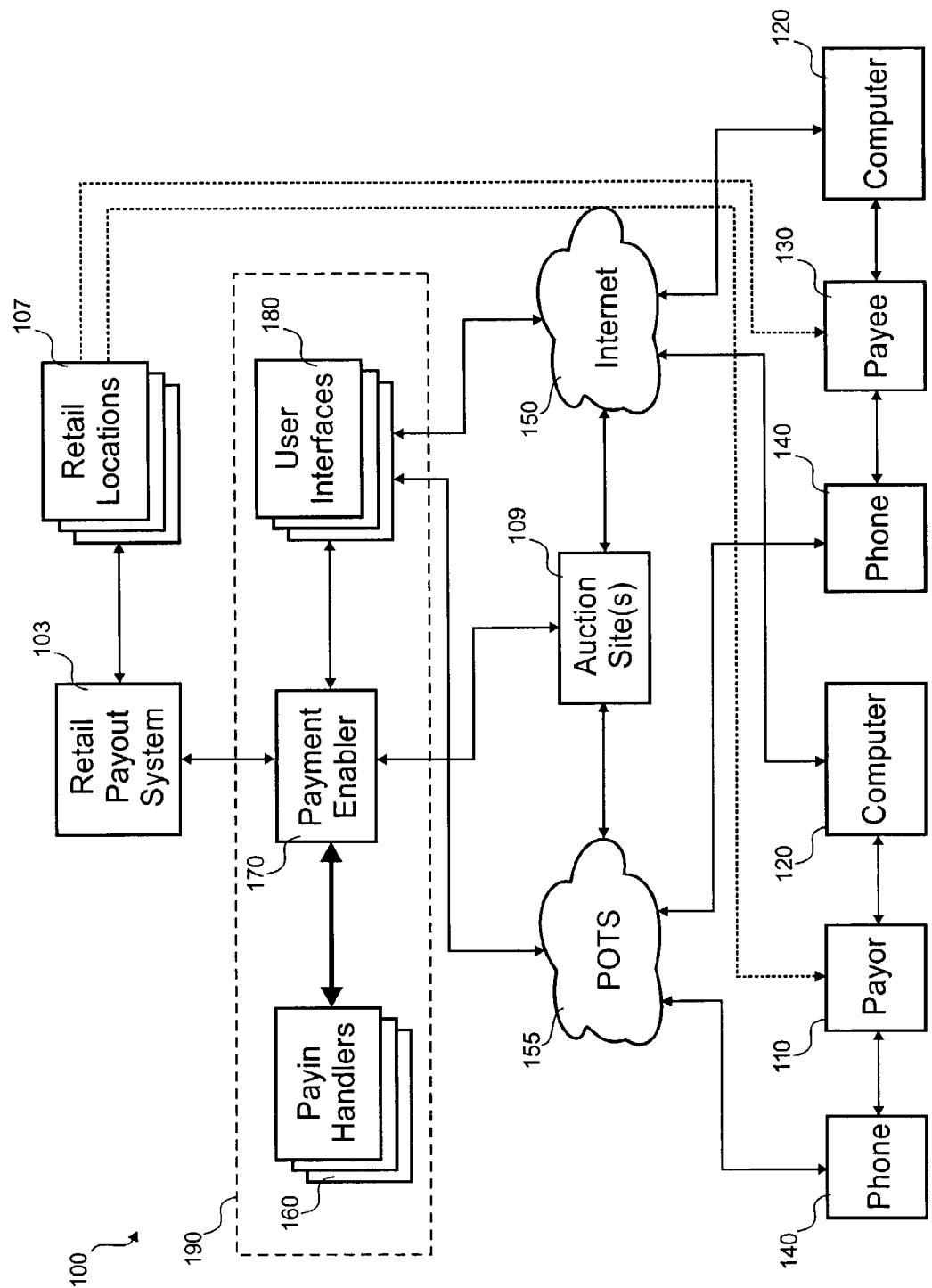
FIG. 1 is a block diagram of an embodiment of an international payment system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides for paying sellers with cash or a negotiable instrument, such as a money order, even though the seller may want payment in a foreign currency and/or drawn on a foreign bank.

In one embodiment, a method for paying for an item with an online payment system by a payor associated with a first currency to compensate a payee associated with a second currency is disclosed. In one step, a selection of the second currency for the online payment system to use when paying the payee is received. Payment information is also received from the payor or payee and includes at least a payee identifier and a first payment amount. A money handler associated with the payor is used to provide at least the first payment amount. A conversion ratio between the first and second currencies is determined. A second payment amount is made available to the payee for pickup at a retail location. The first currency is different from the second currency. The second payment amount is related to the first payment amount.

In another embodiment, a method for paying for items with an online payment system to compensate a payee for transactions with a plurality of payors is disclosed. In one step, a selection of a payment currency for the online payment system to use in paying the payee is received. First payment information is also received. The first payment information includes a first payee identifier and a first payment amount. A first money handler associated a first payor is debited for at least the first payment amount in a first currency. Second payment information is received. The second payment information includes a second payee identifier and a second payment amount. The first payee identifier and second payee identifier both correspond to the payee and may be the same. A second money handler associated a second payor is debited for at least the second payment amount in a second currency. The first and second money handlers may be the same. It is determined if a triggering event is satisfied, where the event is at least one of an monetary event and a temporal event. An amount is made available in a currency at one or more retail locations when the event is satisfied. The amount is equal to or larger than a sum of the first and second payment amounts minus any fees. At least two of the currency, the first currency and the second currency are different. An identity of the payee is authenticated.

In yet another embodiment, a method for paying for an auction item with an online payment system by a payor associated with a first currency to compensate a payee associated with a second currency is disclosed. In one step, payment information is received, which includes at least a payee identifier, a first payment amount and an auction listing identifier. A money handler associated with the payor is debited for at least the first payment amount. A second payment amount is made available to the payee for pickup at one or more retail locations. The second payment amount is related to the first payment amount.

In still another embodiment, a method for paying for an auction item at least partially using an online payment system by a payor to compensate a payee includes receiving, at a host computer system, payment information relating to a transaction. The payment information includes at least a payee identifier, a first payment amount, and an auction identifier. The method also includes transmitting a transaction identifier to the payor. The method further includes receiving funds at a retail location and using the transaction identifier to relate the funds to the transaction. The method also includes making a second payment amount available to the payee. The second payment amount may be based on the payment.

Referring first to FIG. 1, a block diagram of an embodiment of an international payment system 100 is shown. In this embodiment of the payment system 100, a payor 110 and a payee 130 interact with an online transfer system 190 using either a computer 120 and the Internet 150 or a phone 140 and the plain old telephone system (POTS) 155. The payor 110 may interact with a retail location 107 to remit funds directed to the payee 130. The payee 130 may also interact with a retail location 107 to retrieve funds originating from the payor 110.

The payor and payee 110, 130 can access the online transfer system 190 using their computers 120 or phones 140 in this embodiment. When accessing through their computers 120, a web browser is used in this embodiment. Other embodiments could use application software to access the online transfer system 190. For those without access to a computer 120, a phone 140 could be used with voice prompts, touch tone recognition and/or speech recognition to interact with the online transfer system 190. Other embodiments may provide have fewer or more interfaces to the online transfer system 190.

The online transfer system 190 can produce a negotiable or payment instrument to transfer money from the payor 110 to the payee 130. Types of negotiable instruments include: a money order, a cashiers check, a certified check, a travelers check, a bank check, a bank draft, a tellers check, a gift certificate, and/or check. The negotiable instrument is mailed, couriered, or otherwise sent to the payee 130, or made available for pick-up by the payee 130 at a bank or retail location 107. Once the payee 130 obtains the negotiable instrument, it may be cashed in the traditional way at a bank. The negotiable instrument can be any number of currencies that are drawn on any number of banks having different nationalities. With a choice of currency and nationality of the negotiable instrument, the payee 130 has more options when cashing that instrument.

The online transfer system 190 can make funds available at one or more retail locations 107 for pickup by the payee 130. Those funds can be disbursed at the retail location 107 as cash, negotiable instrument, credit to a debit or credit card, a money order, promotional points, a coupon, or any other money substitute. The online transfer system 190 interacts with the retail payout system 103 to indicate how much funds should be available to one or more payees. The online funds transfer system 190 could indicate to the retail payout system each time a new payment should be made available or could accumulate many payout instructions for transmission in bulk. Those bulk transmission could occur at a set periodicity or when a monetary and/or transaction count threshold is met.

The retail payout system 103 is system that manages some payouts available at retail locations 107. A commercially available service like Quick Cash™ available from Western Union™ (available from WU.com) could be used in the retail payout system 103 and retail locations 107. The payment enabler 170 or other party can have a dedicated link, a per-use login and/or a file transfer connection with the retail payout system 103. The amount to make available and currency is passed to the retail payout system 103. Also, the identity of the payee 130 and any authentication information is passed to the retail payout system 103. Authentication information could include a password, pass phrase, test question, obscure personal information and/or other code. Identity cards could also be used for authentication. An exchange rate and fee could be set by the payment enabler 170 at the time of availability or when the payee 130 claims the funds.

Retail locations 107 are store fronts that provide transferred money and other services. These retail locations 107 could also cash checks, provide banking services, payday loans, etc. Various retail locations 107 may provide negotiable instruments and/or cash as possible payout options. Some retail locations 107 could mail the negotiable instrument to the payees 130. The payee 130 could be limited to receiving their payout from one or more retail locations 107. Other retail locations 107 could provide the payout for additional fees.

The online transfer system 190 includes payin handlers 160, a payment enabler 170, and user interfaces 180. The payin handlers 160 allow compensating the payment enabler 170 for the negotiable instrument or cash payout and any associated fees. The payor configures one or more payin handlers 160 such that the payment enabler 170 can automatically transfer in funds. Some embodiments retain the information for interfacing to the payor's account with a payin handler 160 while other embodiments do not. There are national banks are the drawees for the negotiable instruments issued to payees 130 if the negotiable instrument payout option is chosen. These national banks serve each currency and/or jurisdiction. For example, there may be a Swiss bank that issues money orders in Euros, there may be another Swiss bank that issues money orders in Swiss francs, or there may be a French bank that issues money orders in Euros. Typically, the payee wants a negotiable instrument issued by a bank in their country that uses the currency of that country.

The user interfaces 180 accommodate the different methods the payors and payees 110, 130 use to interface with the payment enabler 170. In this embodiment, an Internet interface 180 is provided that includes web pages for users to interact with along with a phone interface. As will be discussed below, other embodiments could have additional interfaces 180.

In this embodiment, the transaction is related to an auction performed at an auction site 109. The payor 110 is a buyer of an auction item sold by the payee 130. The payment enabler 170 can link to the auction site 109 to gather auction information such as a description, an auction identifier, item cost, shipping and handling costs, insurance costs, and payee and payor information. The payee and payor 110, 130 may provide login information to the payment enabler 170 to allow accessing this information. Some embodiments could use the international payment system 100 to pay for items other than auction items. For example, the payment system 100 could be used to pay for goods available at an off-line auction or retail store, an online store, or other payment for goods and/or services. Alternatively, the payment system 100 could be used to send money internationally using a online interface.

Figure 2:
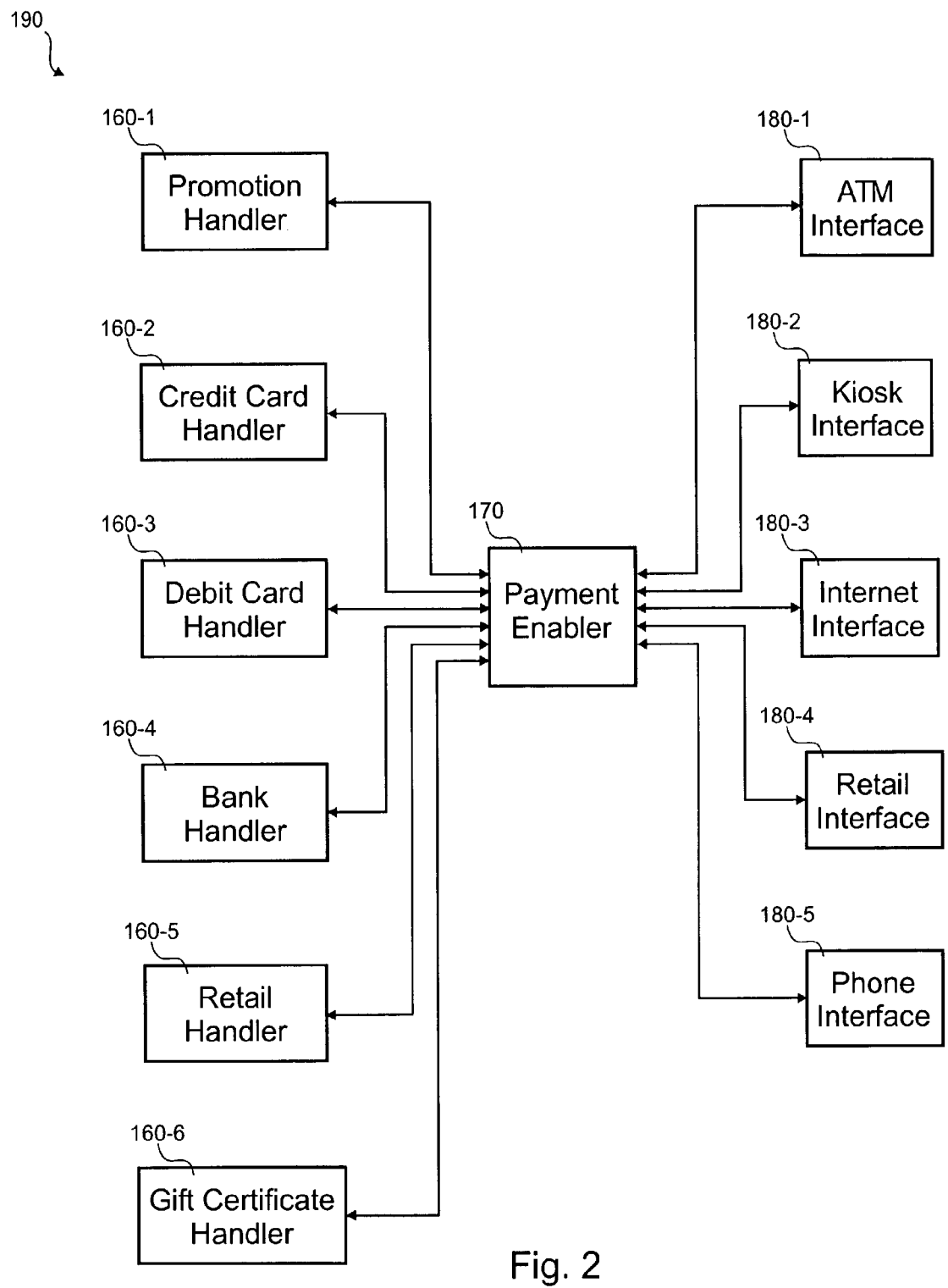
FIG. 2 is a block diagram of an embodiment of an online transfer system.

With reference to FIG. 2, a block diagram of an embodiment of an online transfer system 190 is shown. In this embodiment, there are six handlers 160 and five user interfaces 180. Other embodiments could have more or less handlers 160 and interfaces 180. Each of the handlers 160 allows a payor add money from the payment enabler 170. In some cases, the handlers 160 can accept money from a payout. The user interfaces 180 allow interaction with the payment enabler 170 to transfer money to a stored value fund that is used for the transfer. Some embodiments do not use a stored value fund in the online transfer system 190 by transferring funds directly to the retail payout system 103 which could immediately issue a negotiable instrument or hold the funds in a stored value fund for a later issuance of negotiable instrument or pick-up of cash at a retail location 107.

The promotion handler 160-1 allows adding money in a form other than legal tender or a negotiable instrument. Examples include airline mileage programs and prepaid phone cards. For example, a user could use airline miles at a given exchange rate to send cash to a payee 130 using an airline mileage handler 160-1. A conversion rate would be applied to convert the mileage credit into money. The promotion handler 160-1 may need special information from the payment enabler 170, such as the sender's 110 promotion account number, etc. Some of the interfaces 180 used to gain access to the payment enabler 170 could be used to also gain access to the auction site 140 to allow participation in an auction.

The credit and debit card handlers 160-2, 160-3 largely behave the same. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money from a bank account of the user. The user enters the account number and routing information into the payment enabler 170 with a user interface 180 to facilitate adding and removing of money from the bank handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money out of a bank account of the user instead of an EFT or could use ACH for the transfer.

The retail handler 160-5 typically corresponds to a retail location 107 that may wire money, payout cash, print money orders and/or cash checks. Money may be sent to the retail handler 160-5, whereafter the user 130 is issued cash or a negotiable instrument for that money. Money can be added to the system 100 by the retail handler 160-5 also. For example, the user 110 may give cash to the agent who enters a credit into the payment enabler 170. The user 110 could further specify to the agent a receiver 130 who should get the money. A retail interface 180-4 at the retail location 107 is used by the agent to indicate to the payment enabler 170 that the money has been received from or by the user 110, 130. Through a retail handler 160-5, a sender 110 could use the international payment system 100 without any knowledge of computers or without any debit/credit card or bank account. The retail interface 180-4 is used at the retail location 107 to receive funds from the retail payout system 103.

Gift certificates are redeemed through one or more gift certificate handlers 160-6. The gift certificate, for example, could allow purchase of an auction item sing the online transfer system 190. In some cases the negotiable instrument is paid-out with a gift certificate. The gift certificate can be limited to merchandise and/or services from a single store or a group of stores. In some cases, the gift certificate is used only online by entering a code provided to the receiver or could be printed for use in a bricks and mortar store. Cash equivalents such as Flooz™, formerly available from Flooz.com, could also be provided to the receiver 130.

As briefly discussed above, the ATM interface 180-1 allows interaction with the payment enabler 170. The user may 110, 130 or may not have an affiliation with the ATM that is used to interface with the payment enabler 170. Under this circumstance, the owner of the ATM may charge the user a fee for this service. The user 110, 130 can receive cash from the payment enabler 170 or deposit cash into the payment enabler 170 if the ATM is coupled to a bank handler 160-4. In any event, the ATM interface 180-1 can be used to interface with the payment enabler 170 in the same way a user 110, 130 may interact through a web browser and computer 120 with the payment enabler 170. If the ATM has a magnetic stripe or smart card reader, this could be used by to avoid entering credit or debit card information manually for the payment enabler 170 or could be used to read identification information from a government issued identity card, for example.

A kiosk interface 180-2 allows a user 110, 130 to interact with the payment enabler 170, but typically does not allow adding or removing cash. The kiosk interface 180-2 may be a browser terminal available for general use. Some embodiments may include a check or money order printer with the kiosk interface 180-2 for removing money from the system 100. The kiosk interface 180-2 could be in a retail location 107 and linked to the other systems in the retail location 107 such that a payout could be provided by other systems in the retail location 107.

An Internet interface 180-3 is typically implemented through a web browser. The browser downloads web pages from the payment enabler 170. The Internet interface could be hosted by the computer 120 of the user 110, 130. Some embodiments could host the Internet interface on a portable device such as a wireless phone or personal digital assistant (PDA). The Internet interface 180-3 may also be used by the ATM, kiosk and retail interfaces 180-1, 180-2, 180-4 in whole or in part. The Internet interface 180-3 uses encryption for the link to the payment enabler 170 in some embodiments.

The retail interface 180-4 allows for specialized interaction by an agent at the retail location 107. Agents typically have special training and offer enhanced services over most interfaces 180 and handlers 160. The agent can move money between senders 110 and receivers 130. Also, the agent can pay-in and pay-out money from the payment system 100. The retail interface 180-4 allows an agent to act on behalf of the user when manipulating the user's account. For security, the user's password or PIN may be entered by the user during this manipulation. Further, the agent may verify the identity of the receiver 130 before disbursing the cash or negotiable instrument. In one embodiment, a test question is provided by the sender 110 that the receiver 130 must answer before payment is available to the payee 130. Passcodes or passwords could also be used or testing for obscure information such as the maiden name of the mother of the user.

Interaction with the payment enabler 170 may also be performed over a telephone 140 interfaced to the plain-old telephone system (POTS) 155. The phone interface 180-5 provides voice prompts and recognizes the user's touch-tone or speech recognized input. Enhanced interaction with the phone interface 180-5 could be provided with wireless phones having wireless access protocol (WAP) and/or browser graphical user interfaces (GUIs).

Figure 3:
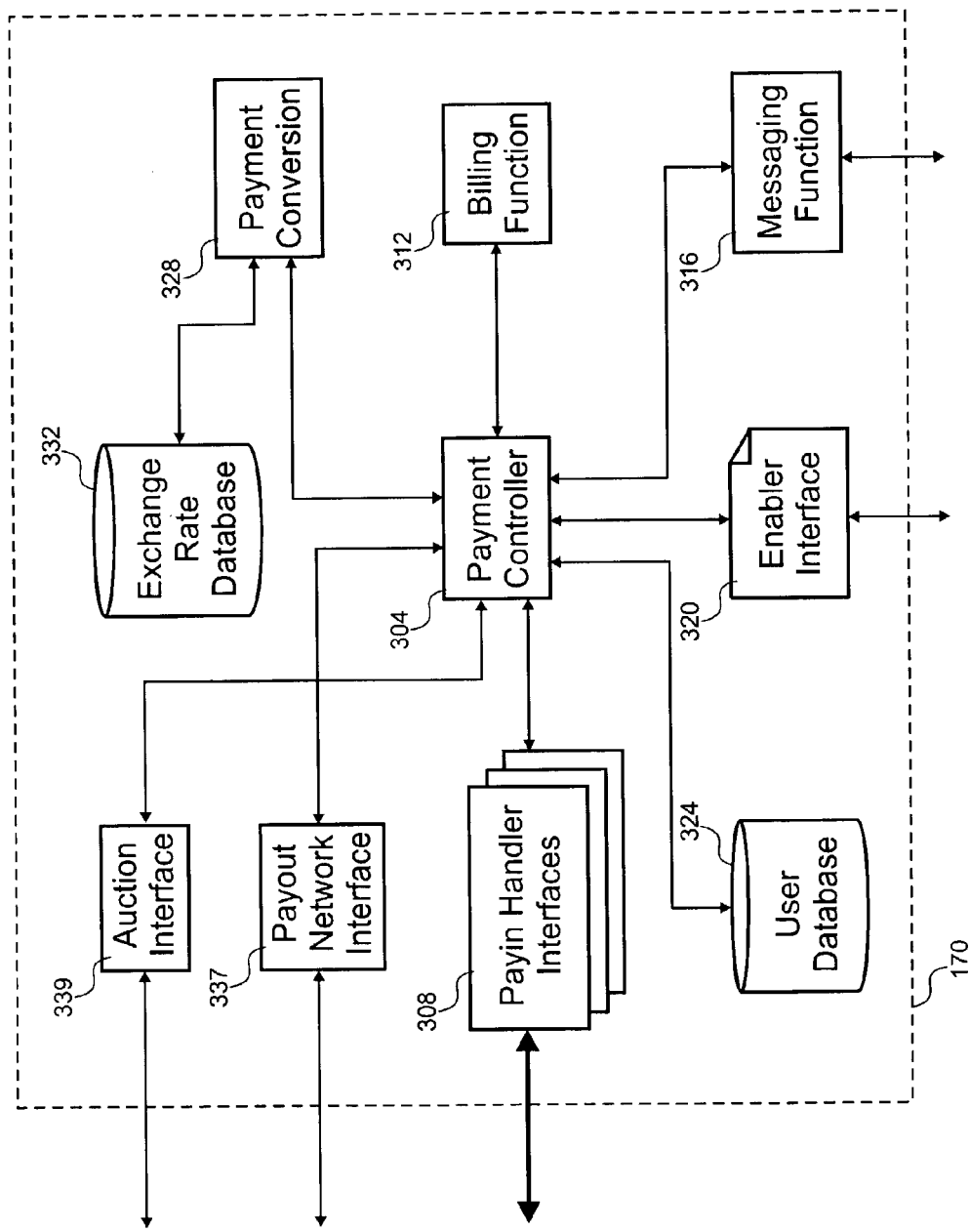
FIG. 3 is a block diagram of an embodiment of a payment enabler.

Referring next to FIG. 3, a block diagram of an embodiment of a payment enabler 170 is shown. This embodiment includes a payment controller 304, payin handler interfaces 308, an auction interface 339, a payout network interface 337, a messaging function 316, an enabler interface 320, a user database 324, a payment conversion function 328, an exchange rate database 332, and a billing function. This embodiment interfaces with users 110, 130 using the Internet. The blocks of this figure may be arranged differently or have their functionality combined or separated on various computers, systems and/or locations as is well known in the art.

The payment controller 304 manages operation of the payment enabler 170. The intelligence of the payment controller 304 is shown as one block in FIG. 3, but could be spread out throughout the payment enabler 170 through combination with other functions. Information gathered from the users and transactions is stored by the payment controller 304 in the user database 304. This information can be viewed and/or modified by the users through the enabler interface 320.

The enabler interface 320 and messaging function 316 are the communication mechanisms used by the payment enabler 170 and users 110, 130. The enabler interface 320 includes a set of web pages for entering information for transactions and viewing information about a user's account. These web pages may be viewed through the ATM interface 108-1, kiosk interface 180-2, Internet interface 180-3, and/or retail interface 180-4 in various embodiments. Messages relating to the user accounts or transactions are sent by the messaging function 316. This embodiment of the messaging function 316 uses e-mail, but other embodiments could use wireless pages, WAP messages, voice mail, instant messages, network broadcasts, or other means to contact the users.

The payout network interface 337 interacts with the retail payout system 103 to make cash available to the payee 130 or send a negotiable instrument to the payee 130. Various national banks are used to back the negotiable instruments given to the payees 130. The payees 130 may be in different countries and/or use different currencies. The negotiable instruments are printed by one or more retail locations 107 and mailed or couriered to the payee 130. A batch file of all the transactions for a particular day are uploaded by the payout network interface 337 to the retail payout system.

Funds are added to the payment enabler 170 by the payor 110 to fund the transaction by using a handler 160. These handlers 160 are manipulated by the payin handler interfaces 308. These interfaces 308 use the account information entered by the user and stored in the user database 324 to draw funds to pay for the negotiable instrument and any associated fees. In this embodiment, the payor 110 is charged a flat fee for the negotiable instrument, but the payee 130 is charged for any currency conversion expenses. Other embodiments could assign these fees differently among the parties 110, 130. The billing function 312 tracks the transactions and determines the fee amount and how that fee amount is applied.

The payee 130 can choose to receive funds in a particular currency and drawn on a bank with a specified nationality. After the funds are received, an event is triggered or the funds are requested, these funds are converted and a service fee may be deducted. The payment conversion function 328 queries the exchange rate database 332 when one of these conversions is requested by the payment controller 304. The exchange rate database 332 is updated daily or at some other frequency to reflect changes in the currency markets. The rate may incorporate a service fee in lieu of or in addition to any other fees. If the exchange rate is fixed when the funds are picked up or delivered to the user 130, the retail location 107 can query the payment conversion function 328 and exchange rate database 332 through the payout network interface 337.

Figure 4:
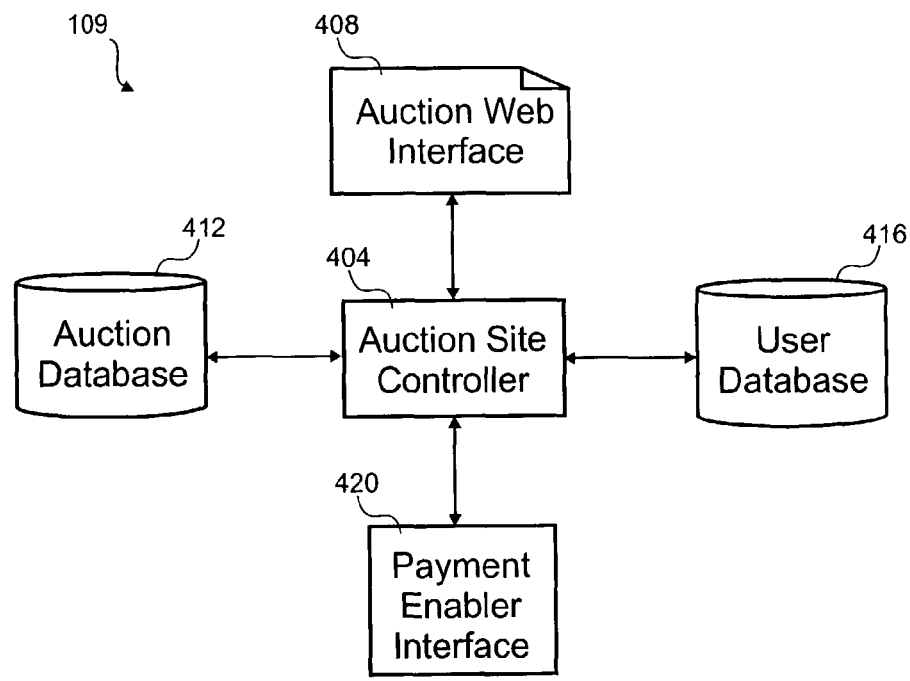
FIG. 4 is a block diagram of an embodiment of an auction site.

With reference to FIG. 4, a block diagram of an embodiment of an auction site 109 is shown. The auction site 109 works in concert with the online transfer system 190 to allow gathering transaction details from the auction site 109. The auction site 109 includes an auction site controller 404, an auction web interface 408, a user database 416, an auction database 412, and a payment enabler interface 420.

The auction site controller 404 manages the functions of the auction site 109. The auction web interface 408 allows interaction with information in the auction database 412 and user database 416. Both the sender and receiver 110, 130 interact with the auction web interface 408 in their roles as buyer and seller of the auction item.

Information on auctions is stored in the auction database 412. Information such as prices, descriptions and terms are stored in the auction database 412. Through the payment enabler interface 420 the information in the auction database 412 is accessible to the payment enabler. For transaction identification or other purposes, the information from the auction database 412 is retrieved and shown to the payor 110 and payee 130.

Any account information on the sender and receiver 110, 130 for the auction site 109 is stored in the user database 416. Information in this database 416 includes demographic information. This demographic information can be used to determine or verify names, addresses, e-mail addresses, shipping preferences, etc.

When the sender or receiver 110, 130 complete an auction, the auction web interface 408 can hands them off to the transfer system 190 to arrange payment. A link in the auction listing can provide the mechanism to hand of the user. The enabler interface 420 facilitates the communication between the auction site 109 and the transfer system 190 such that the user 110, 130 is provided with a seamless experience. User information is passed by the payment enabler interface 420 to the auction interface 339 of the transfer system 190. Through that same pathway, information on clearing of payment is provided to the auction site 109. The auction site can track payment for updating status for the buyers 110 and sellers 130.

Status information on the progress of the auction item shipping and the clearing of funds can be found either on a shippers tracking site or the auction site 109. The status information can be gathered by the auction site 109 or payment enabler 170. For example, shipping status, tracking status, return information, payment delivery, payment redemption, cash payout, and handlers refusing payment could be displayed by auction site 109 and/or payment enabler 170.

Figure 5:
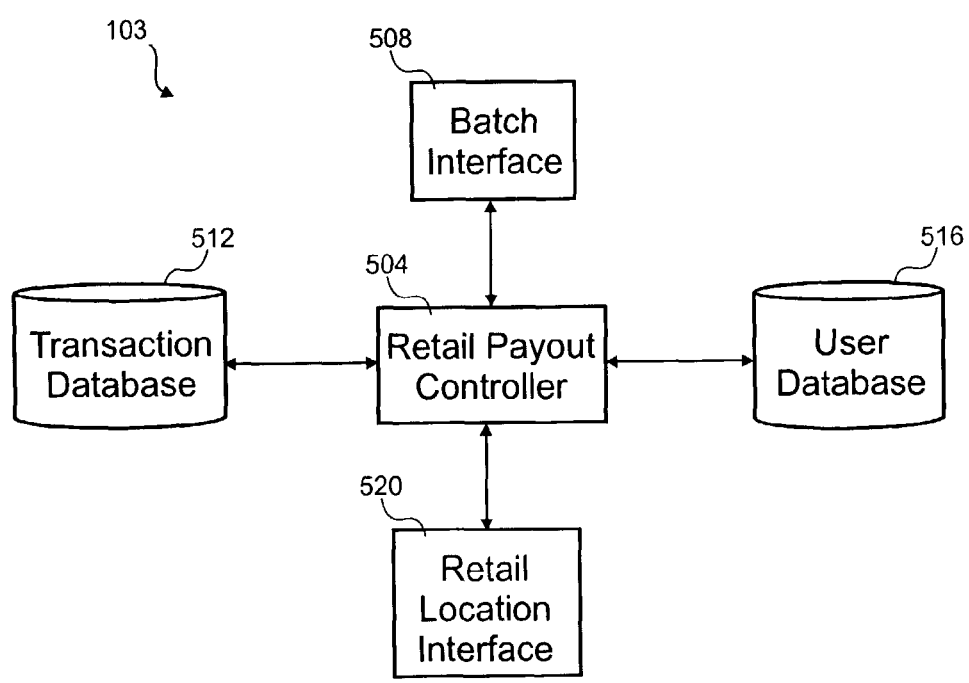
FIG. 5 is a block diagram of an embodiment of a retail payout system.

With reference to FIG. 5, a block diagram of an embodiment of a retail payout system 103 is shown. Included in the retail payout system 103 are a batch interface 508, a retail payout controller 504, a transaction database 512, a user database 516, and a retail location interface 520. Generally, the retail payout system 103 receives instructions from the payment enabler 170 to make funds available at the retail locations 107 or to mail a negotiable instrument from one of the retail locations 107. The agent and/or payee 130 interact with the retail payout system 103 at a retail location 107 to retrieve the payout.

Only one interface to the payment enabler 170 and other users of the retail payout system 103 is shown. More specifically, only the batch interface 508 is depicted, but other embodiments could include a web interface, dedicated link or other connection types to allow funds to be made available at the retail locations 107. The batch interface 508 receives a file from the payment enabler 170 that includes information on one or more transfers. The file is protected with encryption or a protected data channel. Authentication is used to confirm the payment enabler 170 is actually sending the file. The retail payout system 103 will charge the payment enabler as any transfers are redeemed, as the transfers are received or according to some other business terms.

The retail payout controller 504 manages the operation of the retail payout system 103. Transaction related information is stored in a transaction database 512. The status of redemption and clearing of these transactions is also stored in the transaction database 512. Clearing status can be relayed from the payment enabler 170 to the retail payout system 103. Auction information can be relayed from the auction site 109 to the payment enabler 170 to the retail payout system 103. Identity and demographic information on the payee 130 is stored in the user database 516. Communication with the retail locations 107, passes through the retail location interface 520.

Figure 6:
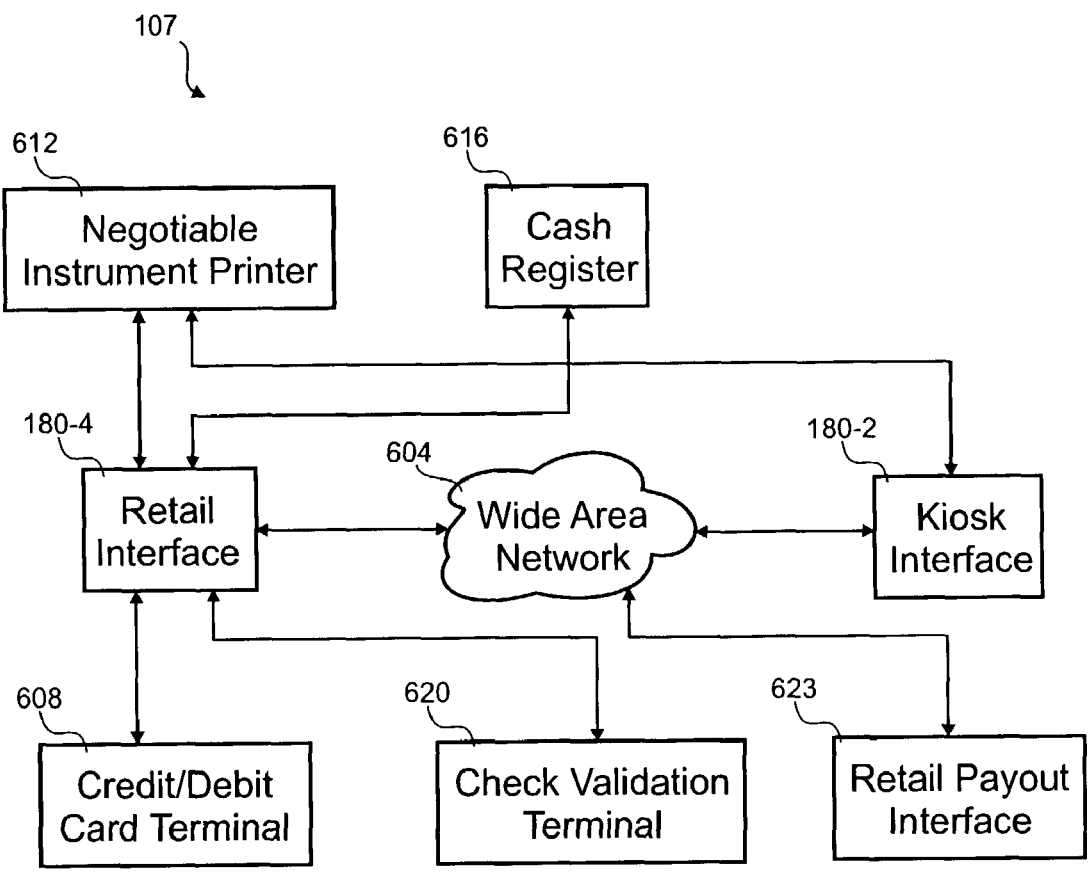
FIG. 6 is a block diagram of an embodiment of a retail location.

With reference to FIG. 6, a block diagram of an embodiment of a retail location 107 is shown. The retail location 107 can be used by the payor 110 to initiate and/or fund a transaction and by the payee 130 to receive and/or cash the negotiable instrument. In some embodiments, the retail locations can print and send negotiable instruments to a payee 130. Also, any user can use the retail location 107 to manage their accounts with the payment enabler 170 and interact with the auction site 109. Both the retail and kiosk interfaces 180-2, 180-4 are coupled to a wide area network 604 that is coupled to the payment enabler 170. The retail location 107 may be used as a retail handler 160-1 to accept money in the form of check, money order, cash, gift certificate, etc. for funding a transaction. In this embodiment, the retail location 107 is a physical store front.

The kiosk interface 180-2 is primarily intended for users to interact with, and the retail interface 180-4 is primarily intended for an agent at the retail location to interact with in this embodiment. In some embodiments, both the kiosk and retail interfaces 180-2, 180-4 are used to perform a transfer. For example, the agent may use the retail interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 is trained to use the system 100, but does not utilize other interfaces 180 for whatever reason.

The retail interface 180-4 and kiosk interface 180-2 can output a negotiable instrument with a printer 612. The payee 130 or agent can use the printer when an in-person pick-up of the negotiable instrument is desired by the payee 130. In some embodiments, each interface 180-2, 180-4 may have a separate printer. The printer 612 may also be used to print receipts and messages related to the sending of a negotiable instrument.

Money can be added to or removed from the payment enabler 170 at the retail location 107 with various money distribution devices 608, 616, 620. In the conventional manner, cash can be received by the cash register, credit or debit cards and be debited by the card terminal 608, and checks can be confirmed with a check validation terminal 620. Cash can be paid out from the cash register 616 or added to a credit or debit card by the card terminal 608 in a conventional fashion. These money distribution devices 608, 616, 620 all interface with the system 100 by way of the retail interface 180-4 such that pay-outs and pay-ins can be automatically recorded by the payment enabler 170. Other embodiments may only accept credit or debit cards to fund a transaction and may not allow printing or cashing of the negotiable instrument at the retail location.

Figure 7A:
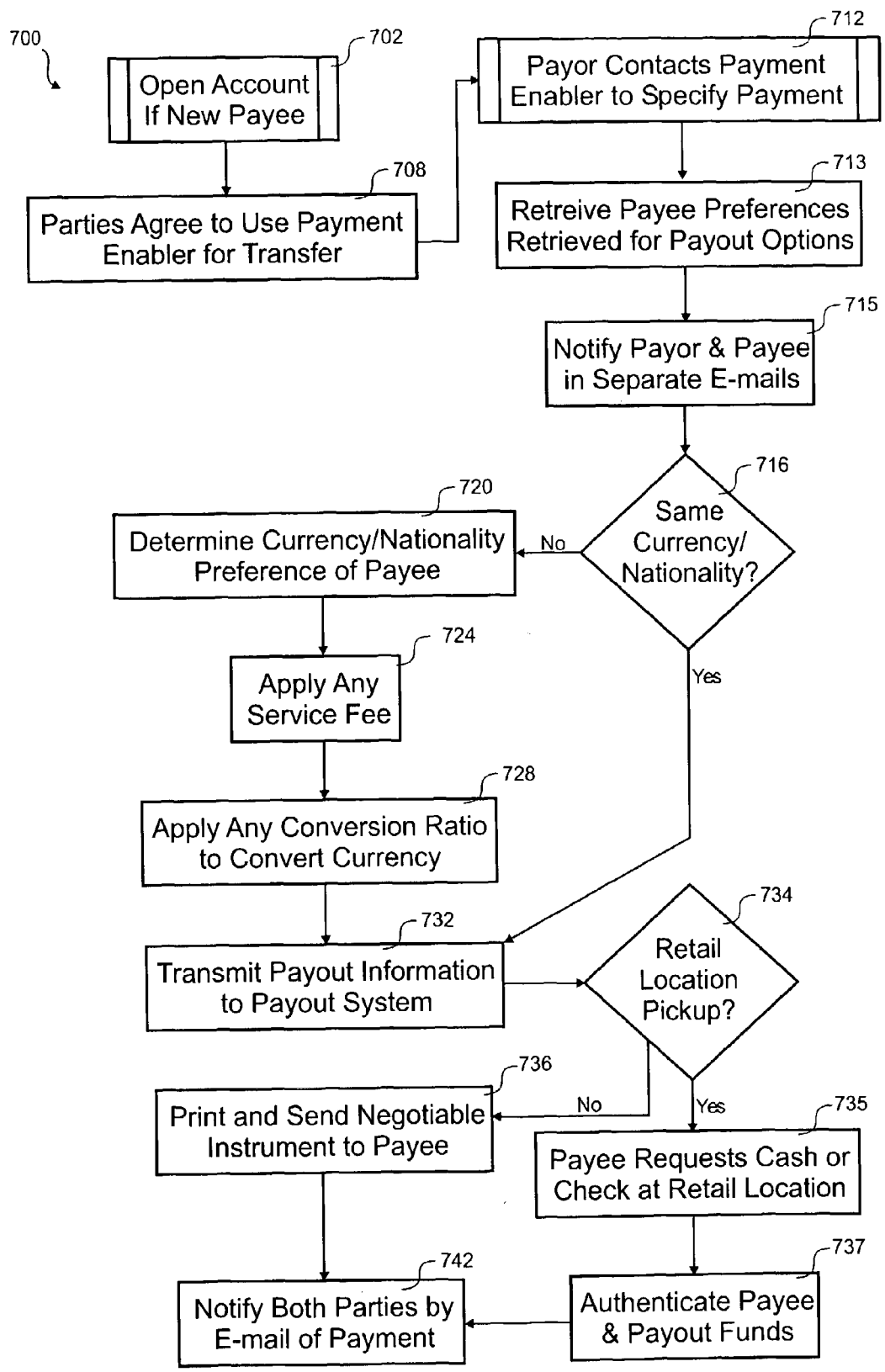
FIG. 7A is a flow diagram of an embodiment of a process for transferring funds to a payee with a negotiable instrument or a credit redeemable at a retail location.

Referring next to FIG. 7A, a flow diagram of an embodiment of a process 700 for paying a payee 130 for a transaction with funds is shown that may be in a currency different from the one used by the payor 110 and may involve a negotiable instrument drawn on a bank in another country. In this embodiment, a negotiable instrument is produced or cash is available for pickup after each transaction. The depicted portion of the process begins in step 702 where a new payee may open an account with the payment enabler 170 if no account has previously been configured with the payment enabler 170. During any account creation, the payee 130 may specify preferences to the payment enabler 170 which would include currency and nationality of the negotiable instrument, payment address, e-mail address, preferred retail location for pickup, etc. Where no information is specified by the payee 130, the payment enabler 170 presumes the currency and nationality of the negotiable instrument is the same as the address of payor 110. Fees may be involved with conversion of payments to a different currency and nationality of the negotiable instrument such that assent to these fees is performed by the payee 130 before this service is available.

In step 708, the parties agree to use the payment enabler 170 for the payment of an auction item. Of course, this agreement could occur before the payee 130 opens a new account in step 702. A button in the auction listing could facilitate choosing the payment enabler 170 for the payment. In step 712, the payor 110 contacts the payment enabler 170 to configure the payment. Payee preferences are retrieved to determine the default options to use for the payee 130 when sending payment in step 713. Delivery address, retail location pickup, currency, and nationality of any negotiable instrument are retrieved in step 713 from the user database 324 in the payment enabler 170.

Notifications are sent to the payor 110 and payee 130 in step 715. In this embodiment, the notifications are different, but they could be the same in other embodiments. The e-mail message to the seller/payee 130 includes an identifier of the auction listing, an amount for payment of the auction, any fee associated with the service, links to the payment enabler to change preferences, shipping information for the payor/buyer 110, and other information. In this embodiment, the payee 130 pays a fee for the ability to pickup cash at a retail location or to receive a negotiable instrument with a currency and/or nationality different from the payor 110. Another e-mail message is sent to the buyer/payor 110 which includes an identifier of the auction listing, an amount paid for the auction item, any fee associated with the service, links to change preferences, contact information of the seller, and other information. In this embodiment, the payor 110 pays a fee for using the payment enabler 170. The payor 110 can send a negotiable instrument to a payee 130 in the same country as the payor 110 for this fee. The preferences in the e-mail message to the payor 110 indicate the payin handler 160 that will be used and an identifier of the account that will be used with that payin handler 160.

In this embodiment, the debit to the payin handler and the sending of money is not performed for a period of time, such as the next day. The payor 110 can modify the default payin handler 160 that will be used and the payee 130 can modify the default payout mechanism for some period of time. For example, the payor 110 can change the payin handler 160 and payee 130 can change the delivery mechanism at any time before the payor account is charged which happens in this embodiment when the negotiable instrument is mailed or when the cash or negotiable instrument is picked-up. Other embodiments could tie the ability to change these preferences to an arbitrary time after the e-mail messages are sent, after the transaction is passed to the retail payout system 103, after the payor 110 specifies the payment to the payment enabler 170, or some other event.

In step 716, a determination is made as to the currency and nationality of the payor 110 and payee 130. In certain cases, the currency may be the same (e.g., Euro), but the parties may be in different European Union countries such that the payee 130 would prefer a negotiable instrument drawn on a bank in the payee's same country. Where either currency or nationality of the negotiable instrument is different, processing proceeds to step 720 where the preference of the payee 130 is determined. In step 724, a service fee is applied to the payee's payout. The fee may be split into one fee for different currencies in the case of a negotiable instrument or cash pickup and another fee for the case of a negotiable instrument with a different nationality than the payor 110.

Although the payee 130 can specify preferences for the currency and bank nationality in this embodiment, other embodiments may work differently. For example, the payee 130 may only be able to specify the currency to use. A default bank for that currency would issue the check. That default bank may or may not have the same nationality of the payee 130. Where there is a choice of bank nationalities for a currency, the payee 130 may be given a choice and/or the system may have a default choice corresponding to the payee's nationality. In another example, the payee 130 may specify only the bank nationality that should issue the check. A default currency would be used for the check. Where the issuing bank supports multiple currencies, the payee 130 could override a default to specify one of the optional currencies.

In step 728, the currency is exchanged by the payment conversion function 328 of the payment enabler 170. In some embodiments, the retail payout system 103 may have a payment conversion capability that is used instead. Yet other embodiments could simply charge the handler 160 in the target currency without conversion where the handler 160 supports various currencies. The payout information is transferred to the appropriate payout system 336 in step 732. Processing also continues to step 732 from step 716 where the currency and nationality of the negotiable instrument is the same for both payor 110 and payee 130.

The payee 130 back in step 713 or the payor 110 in step 712 could have indicated that the payee 130 would pick-up the negotiable instrument and/or cash at a specific or any retail location 107. In step 734, a determination is made as to whether a retail location pick-up is desired by the payee 130. Where sending the negotiable instrument to the payee 130 is desired, the instrument is printed and sent by the payout system 103 and/or retail locations 107 in step 736 to a provided address of the payee 130. Alternatively, the payee 130 may request the negotiable instrument or cash in step 735 where a retail location pick-up is specified. Authentication of the payee 130 is performed and the funds are paid to the payee 130 in step 737. Regardless of how the negotiable instrument or cash is received, an e-mail is sent to the parties in step 742 to indicate successful payment for the listing. Status with the rest of the international payment system 100 is updated to reflect the payout of the funds.

Figure 7B:
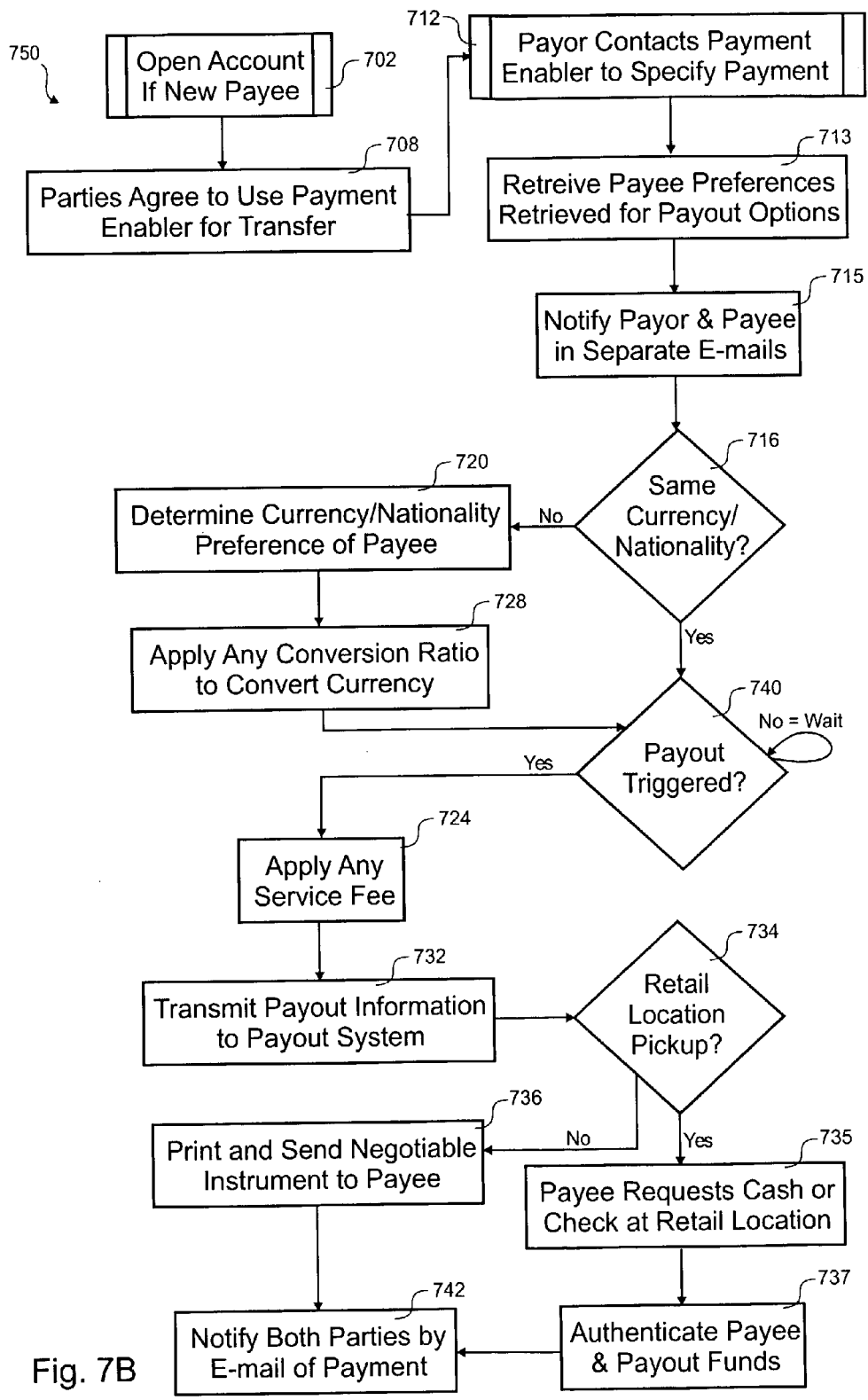
FIG. 7B is a flow diagram of an embodiment of a process for transferring funds to a payee where the payout may be aggregated until a triggering event.

With reference to FIG. 7B, a flow diagram of an embodiment of a process 750 for paying a payee 130 for a transaction is shown where the payout may be aggregated until a triggering event. There are two types of events that may trigger payouts, namely, temporal events and monetary events. Temporal events could be a time period, a calendar date or a specified day in a month and monetary events could be reaching a certain threshold credit amount. In some cases a temporal event and a monetary event must be satisfied. For example, a negotiable instrument is issued if the balance exceeds $500 at the fifteenth day of the month. Reducing the payouts may reduce the number of fees charged in this embodiment.

The process 750 of FIG. 7B is largely the same as the process 700 of FIG. 7A, except that a payout triggering step 740 is added after step 728. Also, the service fee step 724 is performed after a payout is triggered in step 740 rather than with each transfer. The conversions are performed either on each transfer or after a payout is triggered in step 740. The service fee applied in step 724 could be for each payout and/or each transfer. For example, a payout fee could be $5 with a $2 fee for each transaction in that payout.

Figure 8:
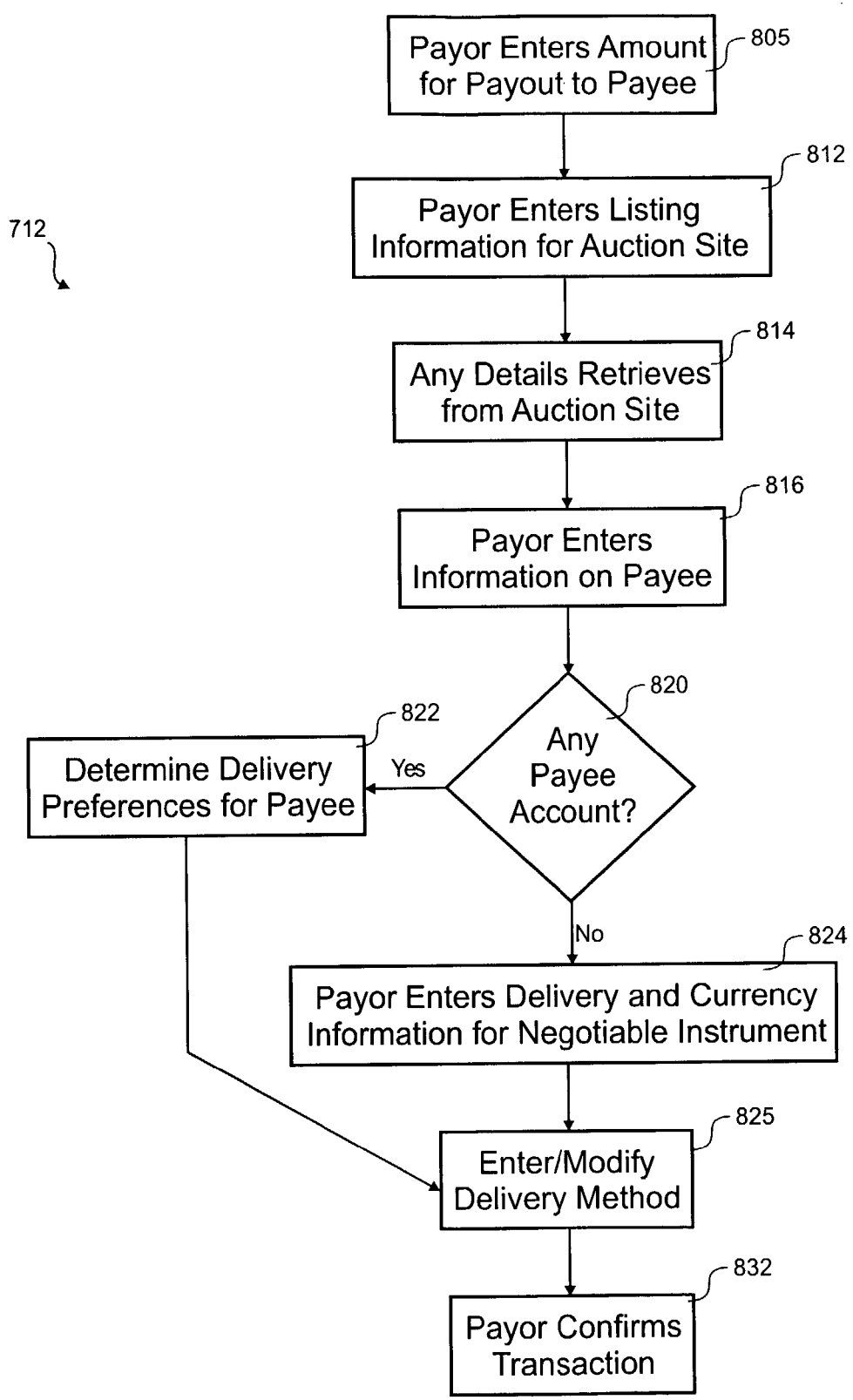
FIG. 8 is a flow diagram of an embodiment of a process for initiating payment with the payment enabler.

Referring next to FIG. 8, a flow diagram of an embodiment of a process 712 for initiating payment with the payment enabler 170 is shown. In this embodiment, the payee may or may not have an account with the payment enabler 170. Some embodiments could start with a step 702 that would open an account for the payor 110 where none existed such that each payor 110 of that process would have an account. Where there is an existing account, the payor 110 may have some fields prepopulated with information about the payee. The depicted portion of the process begins in step 805 where the payor 110 enters an amount for the payout. The amount could include separate amounts for the auction item, the shipping, the insurance, the tax, or the handling. The payment enabler 170 may reject amounts that are too large or too small based upon what is known about the pricing from the auction site 109.

Information about the auction item listing are entered in step 812 so that details can be retrieved. This information will be shown in status fields when the parties review their account history, may be used in various status e-mails and may be printed on the negotiable instrument or cash receipt. The information on the auction site and listing is retrieved in step 814. This information may be presented to the payor 110 for verification before allowing the payor 110 to continue. In step

816, information on the payee 130 is entered, such as an identifier. This embodiment uses an e-mail address as an identifier, but an identifier used by the auction site could be used or any other unique identifier.

If an account can be found in the user database 324 for the payee 130 in step 820, delivery preference information is retrieved from that database 324 in step 822. This preference information includes delivery method, delivery address, currency, and drawee nationality. Where an account cannot be located in step 820, the payor 110 enters the address, currency, and drawee nationality for the payee 130 in step 824. If the payor 110 does not know the nationality of the payee 130, the nationality of the payor 110 is presumed for the payee 130. In step 825, the payor 110 can enter or modify the delivery method for the payment regardless of whether the payee 130 has an account. In some embodiments, the payee 130 could specify that the delivery method and other preferences cannot be modified by the payor 110. The payor 110 can complete the depicted portion of the process 712 by accepting the terms presented for verification in step 832.

Figure 9:
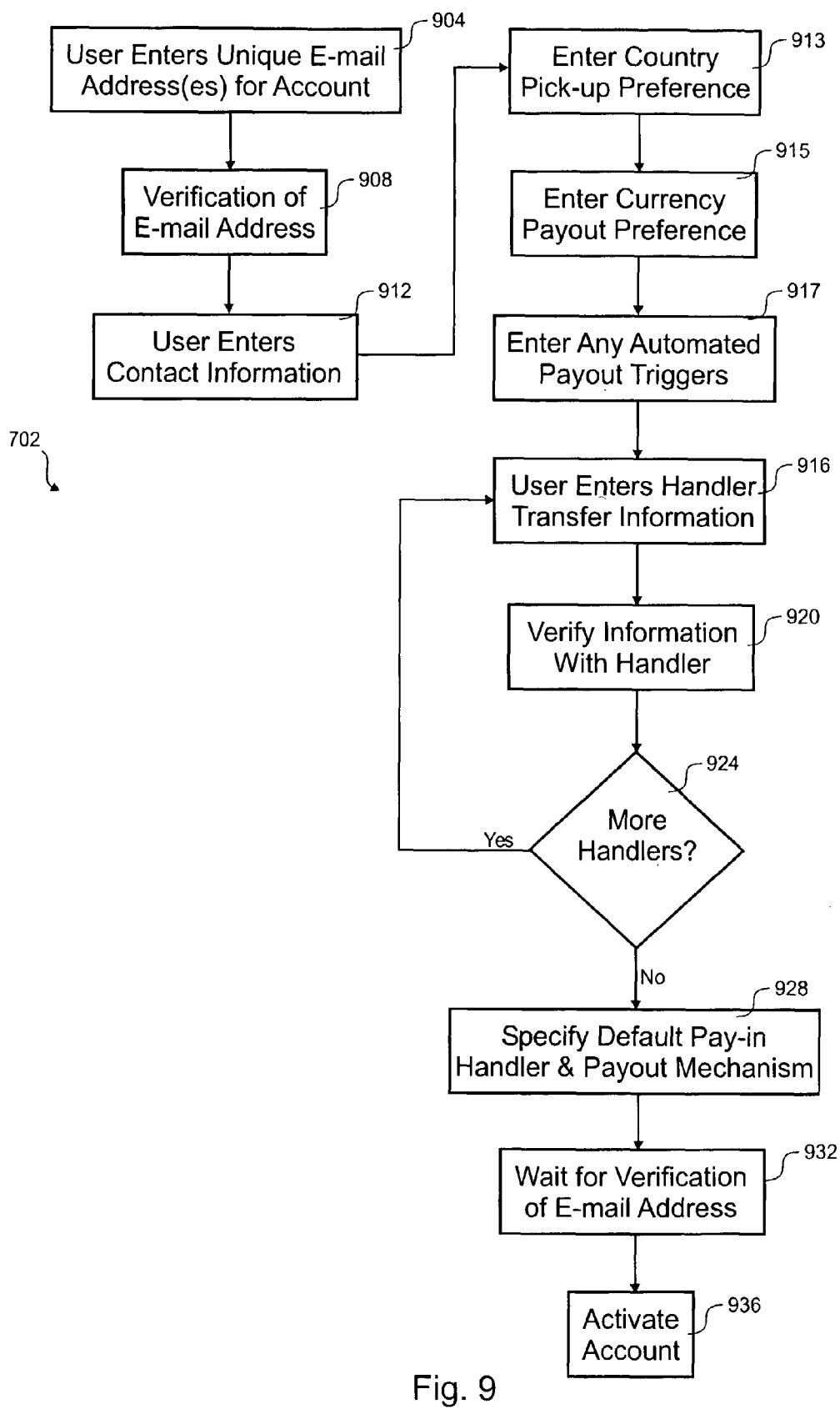
FIG. 9 is a flow diagram of an embodiment of a process for configuring a user with an account for the payment enabler.

Referring to FIG. 9, a flow diagram of an embodiment of a process 702 for configuring a user with an account for the online transfer system 190 is shown. Where the receiver 130 or sender 110 is not external to the system, an account with the payment enabler 170 is created using this process 702. The depicted portion of the process 702 begins in step 904 where the user 110, 130 enters an e-mail address as the unique identifier for the account. The user 110, 130 may want to enter any other e-mail addresses that are aliases of the user and that may be used by counter parties to a transaction. Other embodiments could use any unique identifier for the user 110, 130.

Once an e-mail address is given to the payment enabler 170, it is verified. A message is sent to the e-mail address in step 908. A code is provided and an URL such that the user can click on the URL to load a page where the code is entered to verify the e-mail address. In this embodiment, the code is a randomly generated set of alphanumeric characters. Other embodiments could use any number of methods to verify the e-mail address.

The user 110, 130 enters contact information in step 912. This contact information could include address, phone number, pager address, instant message address, wireless phone address, contact e-mail address, etc. The country of payout and currency are specified in step 913 and 915. Any payout triggers that serve to aggregate payouts are specified in step 917. In step 916, the user enters handler interface information. For example, the user might enter credit card information and bank transfer information. In step 920, the information is verified with the handler 160 to the extent possible for that handler 160. In step 924, the process 612 can loop back to step 916 for entering and verifying additional handlers.

In step 928, a default paying handler 160 and a default payout mechanism can be chosen for transferring money into and out of the system 100. In step 932, the payment enabler 170 waits for verification at least one of the e-mail addresses before activating the account for sending and receiving money with that e-mail address in step 936.

Figure 10:
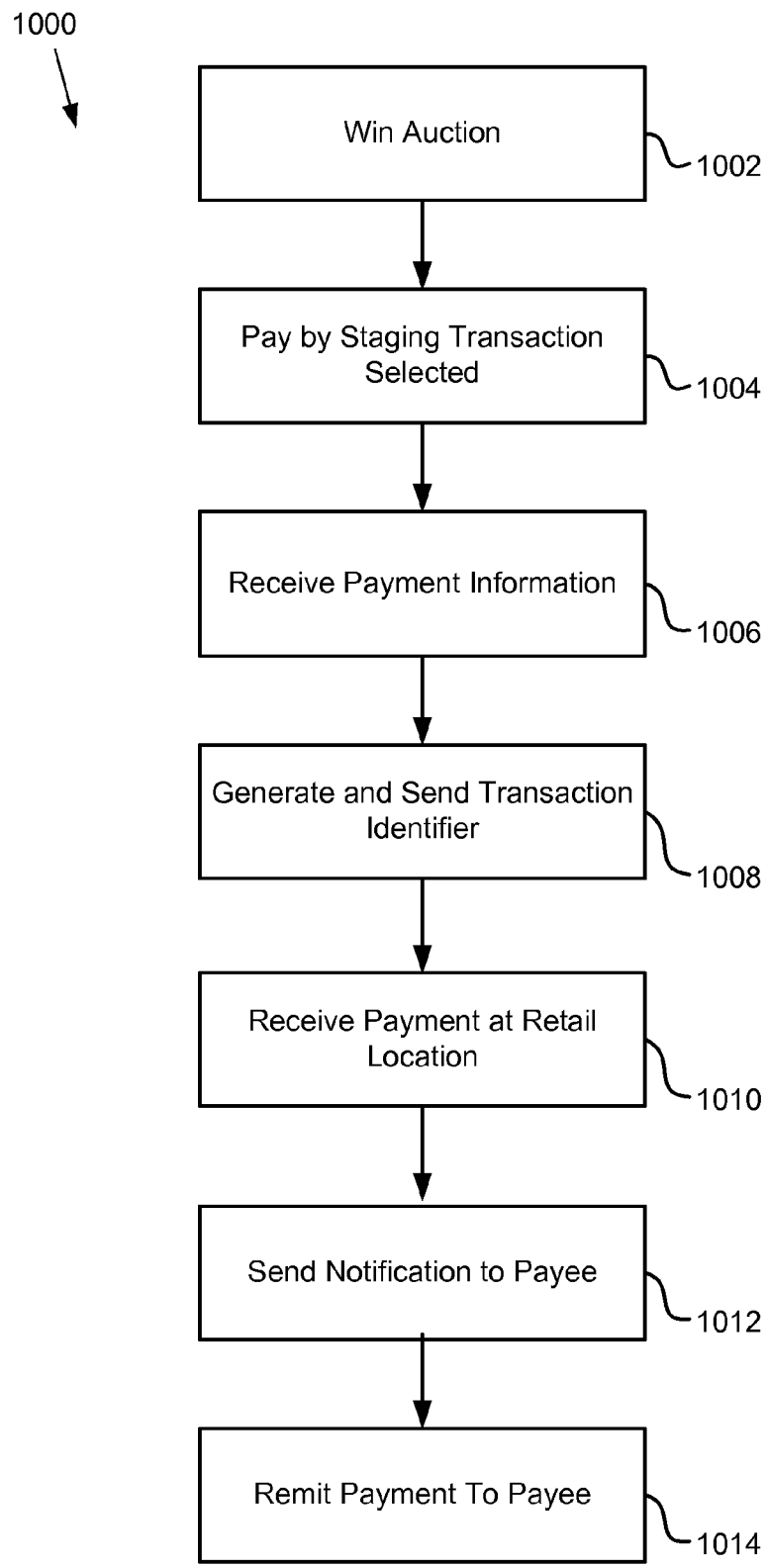
FIG. 10 is a flow diagram of an embodiment of a process for staging a transaction online and settling the transaction at a retail location.

Referring to FIG. 10, a flow diagram of an embodiment of a process 1000 for staging a transaction online and settling the transaction at a retail location is shown. It may be the case that a payor does not have or does not wish to use online-acceptable payment methods to pay for an auction item. According to this embodiment, the payor may use currency or other methods to pay for an auction item at a retail location. According to the process 1000, the payor may stage a transaction online to pay the payee, then settle the transaction by remitting payment at a retail location. Thus, the process begins at block 1002 when the payor wins an auction for an item or otherwise selects an item for purchase from an auction site or other electronic store.

At block 1004, the payor indicates an intention to pay the payee by staging the transaction online. The payor may do so by selecting a hyperlink on an auction settlement page of an auction site 109, for example. By selecting the hyperlink, the payor may be linked to a payment information web page, which may be hosted by the auction site 109 or a different entity. Thus, using a computer 120, a payor 110 may, via the Internet 150 and Internet interface 180-3, access the payment enabler 170 to stage a transaction.

At block 1006, the payor enters transaction information, which may include, for example, a payee identifier, an auction identifier, and a payment amount. It may be the case that some of the information is made available directly from the auction site 109. Once the payor enters the transaction information, the transaction information is received at a host computer system, such as the online transfer system 190, that stores the transaction information. At block 1008, the host computer system generates a transaction identifier and transmits it back to the payor.

At block 1010, the payor goes to a retail location 107 to remit payment. The payor may remit payment in cash or by other means such as a negotiable instrument, credit or debit card, or the like. The payment remitted by the payor may be a first amount that includes both the amount necessary to compensate the payee and any service fees and transaction changes associated with the transaction. Further, the payment remitted by the payor may represent a first currency that is different from the currency in which the payee ultimately receives payment. The retail location 107 may access the online transfer system 190 via the retail payout system 103, which may be a retail payment system in some embodiments. Using the transaction identifier, the retail location 107 informs the online transfer system 190 that the payor has remitted payment.

At block 1012, the online transfer system 190 directs a message to the payee that the payor has remitted payment. This message may be an electronic message, such as an email, which the payee receives via the Internet 150. Alternatively or additionally, the message may be a voice message from a live operator and/or a message generator, which the payee receives by phone 140. Other examples are possible.

At block 1014, the payee receives payment. The payee may receive payment by negotiable instrument, cash, credit to an account, or the like, or any combination of the foregoing. The payee may receive payment by going to a retail location 107 and providing appropriate identification, such as the transaction identifier. The payee may receive payment by requesting a negotiable instrument be mailed to his address. Further still, the payee may receive payment by going to a kiosk or ATM and requesting payment by providing appropriate identification. Other examples are possible. In some embodiments, the payor may dictate the type of payment the payee receives. For example, the payor may specify that a money order is to be mailed to the payee. The payee may receive payment in a different currency than the currency in which the payor remitted funds. The amount of funds received by the payee may be a different amount than the amount remitted by the payor, for example, the amount may be reduced by service fees or transaction charges.

A number of variations and modifications of the invention can also be used. For example, the payment enabler could be integrated into the auction site. With the embodiment of FIG. 7B, the service fee applied in step could be scaled per negotiable instrument or per payment received from a payor. In some of the above embodiments, the negotiable instrument is mailed, couriered, or otherwise sent to the payee, or made available for pick-up by the payee at a bank or retail location. In other embodiments, negotiable instrument could take the form of an electronic transfer to a bank account of a different nationality than the payor or in a currency different than the currency of the payor.

Although some of the above embodiments contemplate the payee having an account with the system, no account is needed in some embodiments. The payor can specify the target currency and identification information for the payee. Once the payee authenticates against the identification information, the payment can be received in cash or as a negotiable instrument. If the payor specifies an address, a negotiable instrument can be mailed directly to the payee without the need for an account for the payee.

While the principles of the invention have been described above in connection with specific apparatuses and methods, it is to be clearly understood that this description is made only by way of example and not as limitation on the scope of the invention.

What is claimed is:

1. A method of paying for an auction item at least partially using an online payment system by a payor to compensate a payee, the method comprising:
   an auction site providing confirmation to the payor that the payor won an electronic auction;
   the auction site receiving a selection from the payor to settle the auction via a transaction that is staged online, wherein the transaction being staged online comprises payment information being provided by the payor online, but settlement by the payor occurring at a retail location;
   the auction site providing to the online payment system payment information relating to the transaction, wherein the payment information comprises at least a payee identifier, a first payment amount, and an auction identifier, wherein the auction identifier relates to the auction won by the payor;
   in response to receiving the payment information, the online payment system creating a transaction identifier relating to the transaction for use in identifying the transaction with a money transfer service provider having associated retail locations;
   the online payment system presenting to the payor an auction settlement screen, wherein the screen has been pre-populated with at least the payee identifier, the first payment amount, the auction identifier and the transaction identifier;
   thereafter, at the retail location, receiving a payment and using the transaction identifier to relate the payment to the transaction, wherein the retail location is one of the retail locations associated with the money transfer service provider;
   making a second payment amount available to the payee based on the payment;
   in response to making the second payment amount associated with the transaction identifier available to the payee, notifying the online payment system that the payor has remitted payment in the transaction associated with the transaction identifier.

2. The method of claim 1, wherein the second payment amount is presented to the payee at a retail location in cash.

3. A method for paying for an auction item at least partially using an online payment system by a payor to compensate a payee, the method comprising:
   at the online payment system, receiving payment information relating to a transaction, wherein the payment information comprises at least a payee identifier, a first payment amount, and an auction identifier, wherein the auction identifier relates to an auction that was won by the payor that was for the auction item;
   in response to receiving the payment information, the online payment system generating a transaction identifier relating to the transaction for use with a money transfer service provider having associated money transfer retail locations;
   the online payment system presenting to the payor an auction settlement screen, wherein the screen has been pre-populated with at least the payee identifier, the first payment amount, the auction identifier, and the transaction identifier;
   at a retail location associated with the money transfer service provider, receiving a payment and using the transaction identifier to relate the payment to the transaction;
   making a second payment amount available to the payee based on the payment; and
   in response to making the second payment amount available to the payee, transmitting from the retail location to the online payment system that the payor has remitted payment in the transaction associated with the transaction identifier.

4. The method of claim 3, further comprising transmitting a message to the payee that the payment has been received relating to the transaction.

5. The method of claim 3, wherein the first payment amount is in a first currency and the second payment amount is in a second currency.

6. The method of claim 5, wherein the first and second currencies are the same.

7. The method of claim 3, wherein the first and second payment amounts vary by one or more fees.

8. The method of claim 3, wherein the second payment amount is at least partially embodied in a negotiable instrument.

9. The method of claim 3, wherein the second payment amount is at least partially embodied in a wire transfer.

10. The method of claim 3, wherein making a second payment amount available to the payee comprises making the second payment amount available to the payee for pickup at any of a plurality of retail locations.

11. The method of claim 3, wherein making a second payment amount available to the payee comprises sending a money order to the payee.

12. The method of claim 3, wherein the payee identifier is an e-mail address associated with the payee.

13. A computer-based system for paying for an auction item by a payor to compensate a payee, the system comprising:
   an online payment system that has computer-executable instructions to:
      receive payment information at a host computer system relating to a transaction comprising at least a payee identifier, a first payment amount, and an auction identifier, wherein the auction identifier relates to an auction that was won by the payor that was for the auction item;
      in response to receiving the payment information at the host computer system, creating a transaction identifier relating to the transaction generated by the host computer system for use in identifying the transaction to a money transfer service provider having associated money transfer retail locations;

present, at a computer remote from the host computer system, to the payor an auction settlement screen, wherein the screen has been pre-populated with at least the payee identifier, the first payment amount, the auction identifier, and the transaction identifier;

receive, at the host computer system, information from a retail location associated with the money transfer service provider that a payment associated with the transaction identifier has been received relating to the transaction; and make a second payment amount available to the payee based on the payment.

14. The system of claim 13, wherein the online payment system is further programmed to transmit a message to the payee that the payment has been received relating to the transaction.

15. The system of claim 13, wherein the first payment amount is in a first currency and the second payment amount is in a second currency.

16. The system of claim 15, wherein the first and second currencies are the same.

17. The system of claim 13, wherein the first and second payment amounts vary by one or more fees.

18. The system of claim 13, wherein the second payment amount is at least partially embodied in a negotiable instrument.

19. The system of claim 13, wherein the second payment amount is at least partially embodied in a wire transfer.

20. The system of claim 13, wherein the online payment system is further programmed to make the second payment amount available to the payee for pickup at any of a plurality of retail locations.

21. The system of claim 13, wherein the online payment system is further programmed to cause a money order representing the second payment amount to be sent to the payee.

22. The system of claim 13, wherein the payee identifier is an e-mail address associated with the payee.

23. The system of claim 13, further configured such that the payee must present the transaction identifier at the retail location to receive the second transaction amount.

\* \* \* \* \*